United States Patent
Yeo (10) Patent No.: US 10,234,612 B2
(45) Date of Patent: Mar. 19, 2019

(54) POLARIZING PLATE AND METHOD FOR MANUFACTURING THE SAME

(71) Applicant: SAMSUNG SDI CO., LTD., Yongin-si, Gyeonggi-do (KR)

(72) Inventor: Jong Hoon Yeo, Uiwang-si (KR)

(73) Assignee: SAMSUNG SDI CO., LTD., Yongin-si (KR)

(*) Notice: Subject to any disclaimer, the term of this patent is extended or adjusted under 35 U.S.C. 154(b) by 530 days.

(21) Appl. No.: 14/751,042

(22) Filed: Jun. 25, 2015

(65) Prior Publication Data
US 2016/0025909 A1    Jan. 28, 2016

(30) Foreign Application Priority Data
Jul. 23, 2014   (KR) .................. 10-2014-0093587

(51) Int. Cl.
| | | |
|---|---|---|
| G02B 5/30 | (2006.01) | |
| B29C 55/04 | (2006.01) | |
| B29L 11/00 | (2006.01) | |
| B29C 65/00 | (2006.01) | |
| B29K 629/00 | (2006.01) | |

(52) U.S. Cl.
CPC .............. *G02B 5/305* (2013.01); *B29C 55/04* (2013.01); *B29C 66/45* (2013.01); *B29C 66/712* (2013.01); *B29C 66/7315* (2013.01); *B29K 2629/00* (2013.01); *B29L 2011/0066* (2013.01); *Y10T 428/10* (2015.01); *Y10T 428/1036* (2015.01)

(58) Field of Classification Search
CPC ....... G02B 5/305; B29C 66/45; B29C 66/712; B29C 66/7315; B29K 2629/00; Y10T 428/10; Y10T 428/1036
See application file for complete search history.

(56) References Cited

U.S. PATENT DOCUMENTS

| | | | | |
|---|---|---|---|---|
| 2006/0028601 A1* | 2/2006 | Kawahara | ............ | G02B 5/3083 349/117 |
| 2009/0279030 A1* | 11/2009 | Toyama | ................ | C08G 18/61 349/117 |
| 2013/0242236 A1* | 9/2013 | Shutou | ................ | G02B 5/3033 349/96 |

FOREIGN PATENT DOCUMENTS

| | | |
|---|---|---|
| CN | 102200607 A | 9/2011 |
| CN | 102466835 A | 5/2012 |
| JP | 2005-128097 A | 5/2005 |
| JP | 2011-081399 A | 4/2011 |
| JP | 2011-203641 A | 10/2011 |
| KR | 10-2001-0113559 A | 12/2001 |

(Continued)

OTHER PUBLICATIONS

Korean Office action dated Sep. 8, 2016, corresponding to Korean Patent Application No. 10-2014-0093587 (6 pages).

(Continued)

*Primary Examiner* — Anthony J Frost
(74) *Attorney, Agent, or Firm* — Lewis Roca Rothgerber Christie LLP

(57) ABSTRACT

A polarizing plate includes a polarizer and a protective film formed on at least one surface of the polarizer. A transverse direction (TD) shrinkage stress ratio $SR_A$ of the polarizing plate ranges from about 1% to about 10%, as calculated using Equation 1:

$$SR_A (\%) = (S1/S2) \times 100 \quad (1)$$

In Equation 1, S1 is the TD shrinkage stress of the protective film, and S2 is the TD shrinkage stress of the polarizer.

13 Claims, 2 Drawing Sheets

(56) References Cited

FOREIGN PATENT DOCUMENTS

| | | |
|---|---|---|
| KR | 10-2010-0084290 A | 7/2010 |
| TW | 201234059 A | 8/2012 |
| TW | 201416218 A | 5/2014 |
| TW | 201418395 A | 5/2014 |
| WO | WO 2013/187134 A1 | 12/2013 |

OTHER PUBLICATIONS

Korean Office action dated Mar. 24, 2017, corresponding to Korean Patent Application No. 10-2014-0093587 (6 pages).
Chinese Office action dated Mar. 31, 2017, corresponding to Chinese Patent Application No. 201510420431.8 (8 pages).
Taiwan Office action dated Jun. 22, 2016, corresponding to Taiwanese Patent Application No. 104123474 (7 pages).

\* cited by examiner

POLARIZING PLATE AND METHOD FOR MANUFACTURING THE SAME

CROSS-REFERENCE TO RELATED APPLICATION

This application claims priority to and the benefit of Korean Patent Application No. 10-2014-0093587, filed on Jul. 23, 2014 in the Korean Intellectual Property Office, the entire content of which is incorporated herein by reference.

BACKGROUND

1. Field

Embodiments of the present invention relate to a polarizing plate and a method for manufacturing the same.

2. Description of the Related Art

An optical display device may include a liquid crystal display (LCD) panel and a polarizing plate attached to at least one side of the LCD panel. In general, a polarizing plate includes a polarizer having a polarizing function, and protective films formed on one surface or both surfaces of the polarizer.

With the recent trend for thin optical display devices, thin polarizing plates are in demand. Thus, attempts have been made to provide thinner polarizing plates by eliminating one of the protective films on the polarizer. For example, a typical polarizing plate includes a triacetylcellulose (TAC)-less polarizing plate in which a TAC film is attached to only one surface of the polarizer.

In such a polarizing plate in which the protective film is formed on only one surface of the polarizer, however, both surfaces of the polarizer exhibit asymmetrical shrinkage. Therefore, curling can occur in a transverse direction (TD) due to a difference in the strength of shrinkage between the polarizer and the protective film according to treatment conditions (e.g., storage, transportation or processing environments). Such TD curling makes it difficult to treat the protective film. Further, bubbles are generated in polarizing plates having curls when the polarizing plate is bonded to the LCD panel, thereby reducing the reliability of the LCD display.

SUMMARY

According to embodiments of the present invention, a polarizing plate includes a polarizer; and a protective film formed on at least one surface of the polarizer. A transverse direction (TD) shrinkage stress ratio $SR_A$ of the polarizing plate ranges from about to about 10% as calculated according to Equation 1.

$$SR_A\ (\%) = (S1/S2) \times 100 \tag{1}$$

In Equation 1, S1 is the TD shrinkage stress of the protective film, and S2 is the TD shrinkage stress of the polarizer.

The polarizing plate may include the protective film on only an upper surface of the polarizer, and not on a lower surface of the polarizer.

The polarizer may have a TD shrinkage stress S2 of about 0.5 N/10 mm to about 10.0 N/10 mm, and the protective film may have a TD shrinkage stress S1 of about 0.005 N/10 mm to about 1.0 N/10 mm.

The protective film may include a polyester resin film, a cellulose resin film, a cyclic polyolefin resin film, a polycarbonate resin film, a polyethersulfone resin film, a polysulfone resin film, a polyamide resin film, a polyimide resin film, a non-cyclic polyolefin resin film, a polyarylate resin film, a polyvinyl alcohol resin film, a polyvinyl chloride resin film, or a polyvinylidene chloride resin film.

The polarizing plate may further include a release film formed on a lower surface of the polarizer, and an adhesive layer formed between the release film and the polarizer.

The polarizing plate may further include an optical film, and the optical film may include at least one of a surface protective film for the polarizing plate, a reflective film, an anti-reflective film, a diffusive film, a retardation film, and/or a brightness-enhancing film.

The polarizing plate may have a TD shrinkage stress ratio $SR_B$ of about 1% to about 10% as calculated according to Equation 2.

$$SR_B\ (\%) = (S3/S2) \times 100 \tag{2}$$

In Equation 2, S3 is the sum of the TD shrinkage stresses of the respective optical films and S2 is the TD shrinkage stress of the polarizer.

The polarizing plate may have a curl height of about +4.0 mm to about −4.0 mm, as measured at 23° C. and 55% RH.

According to embodiments of the present invention, a method of manufacturing a polarizing plate includes forming a stack body by stacking a protective film on one surface of a polarizer. The stack body has a transverse direction (TD) shrinkage stress ratio $SR_A$ of about 1% to about 10% as calculated according to Equation 1.

$$SR_A\ (\%) = (S1/S2) \times 100 \tag{1}$$

In Equation 1, S1 is the TD shrinkage stress of the protective film and S2 is the TD shrinkage stress of the polarizer.

The polarizer may be manufactured by dyeing and stretching a polyvinyl alcohol film.

The polarizer may be stretched to have an accumulated stretching ratio of about 5 to about 10.

The method may further include attaching an optical film to one or both surfaces of the stack body.

The polarizing plate may have a TD shrinkage stress ratio $SR_B$ of about 1% to about 10%, as calculated according to Equation 2.

$$SR_B\ (\%) = (S3/S2) \times 100 \tag{2}$$

In Equation 2, S3 is the sum of the TD shrinkage stresses of the respective optical films and S2 is TD shrinkage stress of the polarizer.

In embodiments of the present invention, curling of the polarizing plate is controlled, thereby making it easy to treat a film.

In addition, according to embodiments of the present invention, the occurrence of a curl in the polarizing plate can be prevented or reduced.

Further, according to embodiments of the present invention, curling can be controlled without being affected by the thickness of the polarizer and the protective film for the polarizer. This advantage makes it easy to provide a thin polarizing plate while improving processability of the polarizing plate.

Furthermore, in embodiments of the present invention, a polarizing plate can be bonded to an LCD panel without the generation of bubbles or curling at a distal end thereof (or with a reduced amount of bubbles or curling). According to some embodiments, a method of manufacturing the same is provided.

DETAILED DESCRIPTION

Embodiments of the present invention will be described with reference to the accompanying drawings. It should be understood that the described embodiments of the present invention may be modified in different ways, and the present invention is not limited to the following embodiments. In the drawings, portions irrelevant to the description are omitted for clarity. Like components are denoted by like reference numerals throughout the specification.

As used herein, terms such as "upper" and "lower" are defined with reference to the accompanying drawings. Thus, it is understood that the term "upper surface" can be used interchangeably with the term "lower surface."

It is understood that when an element such as a layer, film, region or substrate is referred to as being placed "on" another element, it can be directly placed on the other element, or an intervening layer(s) may also be present. On the other hand, when an element is referred to as being placed "directly on" another element, intervening layer(s) are not present.

According to embodiments of the invention, a polarizing plate includes a polarizer; and a protective film formed on at least one surface of the polarizer. The polarizing plate has a transverse direction (TD) shrinkage stress ratio $SR_A$ of about 1% to about 10%. The TD shrinkage stress ratio $SR_A$ is calculated by the following Equation 1.

$$SR_A (\%) = (S1/S2) \times 100 \quad (1)$$

In Equation 1, S1 is the TD shrinkage stress of the protective film for the polarizer and S2 is the TD shrinkage stress of the polarizer.

As used herein, the "TD shrinkage stress" may be measured by any typical measurement instrument. For example, the TD shrinkage stress may be measured using a rectangular sample having a machine direction (MD) length of 80 mm and a TD width of 10 mm. To measure the TD shrinkage stress, the sample is fastened at both sides thereof in the transverse direction to a shrinkage stress measurement instrument (e.g., TA.XT Plus, Stable Micro Systems Ltd.) and left at 80° C. for 100 minutes. In Equation 1, a testing target may be the polarizer or the protective film.

Figure 1:
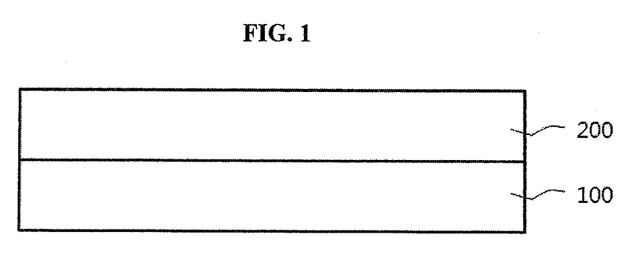
FIG. 1 is a schematic cross-sectional view of a polarizing plate including a protective film on one surface of a polarizer according to embodiments of the present invention.

FIG. 1 is a schematic cross-sectional view of a polarizing plate according to embodiments of the invention. Referring to FIG. 1, the polarizing plate includes a polarizer 100 and a protective film 200 formed on an upper surface of the polarizer 100. The protective film 200 has a shrinkage stress ratio of about 1% to about 10% with respect to the shrinkage stress of the polarizer 100 (hereinafter, referred to as the shrinkage stress ratio of the protective film, $SR_A$). In some embodiments, the protective film may have a shrinkage stress ratio ($SR_A$) of about 2% to about 9%, for example, about 2% to about 7%. The shrinkage stress ratio $SR_A$ of the protective film is calculated by Equation 1.

The polarizer 100 and the protective film 200 formed on the upper surface of the polarizer 100 exhibit different shrinkages. For example, the polarizer 100 exhibits larger shrinkage than the protective film 200 at high temperature and high humidity. In this case, curling can occur in the transverse direction of the polarizing plate since the polarizer 100 and the adjoining protective film 200 exhibit different shrinkages.

However, the polarizing plate according to embodiments of the invention can control the ratio of the shrinkage stress of the protective film 200 to the shrinkage stress of the polarizer 100, thereby preventing (or reducing) TD release curling without limiting the thickness, material, etc. of the polarizer and the protective film. Thus, the polarizing plate is easy to handle and bubbles generated when the polarizing plate is bonded to an LCD panel may be minimized.

For the polarizer 100, any polyvinyl alcohol film may be used so long as the film is suitable for us in polarizing plates. The polarizer may be manufactured by any suitable method. For example, the polarizer may be manufactured by dyeing a polyvinyl alcohol film with a dichroic dye (such as iodine or boric acid), followed by stretching the dyed film in a predetermined direction.

The polarizer may have a TD shrinkage stress (S2) of about 0.5 N/10 mm to about 10.0 N/10 mm. For example, the polarizer may have a TD shrinkage stress (S2) of about 1.0 N/10 mm to about 5.0 N10 m. Within either of these ranges, the polarizer can further suppress TD curling and can reduce shrinkage of the overall polarizing plate. The TD shrinkage stress of the polarizer is measured by the measurement method described above. For example, shrinkage stress of the polarizer is measured using a sample cut to a length of 80 mm in the machine direction (MD) and a width of 10 mm in the transverse direction (TD) after the sample is fastened at both TD sides thereof to a shrinkage stress measurement instrument (e.g., TA.XT Plus, Stable Micro Systems Ltd.) and left at 80° C. for 100 minutes.

The polarizer may have any thickness. For example, the polarizer may have a thickness of about 0.1 μm to about 30 μm, or about 0.5 μm to about 10 μm. Within either of these ranges, the polarizer can be used to manufacture a thin polarizing plate.

The protective film 200 is attached to one or both surfaces of the polarizer and protects the surface of the polarizer. The protective film for the polarizer may have a TD shrinkage stress of about 0.005 N/10 mm to about 1.0 N/10 mm. For example, the protective film may have a TD shrinkage stress of about 0.01 N/10 mm to about 0.5 N/10 mm. Within either of these ranges, the protective film for the polarizer can further suppress TD curling and can further reduce shrinkage of the overall polarizing plate.

The TD shrinkage stress of the protective film for the polarizer is measured by the same method as the method for measuring the TD shrinkage stress of the polarizer. For example, shrinkage stress of the protective film (i.e. the sample) is measured using a sample cut to a length of 80 mm in the machine direction (MD) and a width of 10 mm in the transverse direction (TD) after the sample is fastened at both TD sides thereof to a shrinkage stress measurement instrument (e.g., TA.XT Plus, Stable Micro Systems Ltd.) and left at 80° C. for 100 minutes.

The protective film for the polarizer may have any thickness. For example, the protective film may have a thickness of about 5 μm to about 200 μm, or about 10 μm to about 100

µm. Within either of these ranges, the protective film can be used to manufacture a thin polarizing plate.

The protective film for the polarizer may include an optically transparent film. For example, the protective film for the polarizer may include a polyester resin film including polyethylene terephthalate, polybutylene terephthalate, polyethylene naphthalate, polybutylene naphthalate, and the like; a cellulose resin film including triacetylcellulose and the like; a cyclic polyolefin resin film including norbornene resin and the like; a polycarbonate resin film; a polyethersulfone resin film; a polysulfone resin film; a polyamide resin film; a polyimide resin film; a non-cyclic polyolefin resin film; a polyarylate resin film; a polyvinyl alcohol resin film; a polyvinyl chloride resin film; a polyvinylidene chloride resin film; and so on.

In some embodiments, the protective film for the polarizer may be formed with a coating layer on a surface thereof or may be subjected to surface treatment to impart an anti-reflection function. For example, the protective film may further include an anti-reflection layer for anti-glare (AR), low reflection (LR), or the like. Such an anti-reflection layer may be formed by coating, surface treatment or the like, but is not limited thereto.

In some embodiments, the protective film for the polarizer may perform a phase retardation function. For example, the protective film may be a film having zero retardation, $\lambda/4$ retardation, $\lambda/2$ retardation, or the like.

In embodiments of the invention, the polarizing plate may further include an adhesive layer between the protective film and the polarizer for bonding the protective film to the polarizer. The adhesive layer may be formed of any suitable adhesive. For example, the adhesive may include pressure sensitive adhesives (PSA), photocurable adhesives, water-based adhesives, or the like. The adhesive layer may have any thickness without limitation. For example, the adhesive layer may have a thickness of about 0.2 µm to about 10 µm, or about 0.5 µm to about 5 µm. Within either of these ranges, the polarizing plate may have reduced thickness.

In some embodiments, the polarizing plate may include the protective film and the polarizer formed as a single body. In the single body, an adhesive layer or a coating layer is not provided between the protective film and the polarizer. That is, the protective film directly adjoins one surface of the polarizer. In this case, the thickness of the polarizing plate can be further reduced.

In embodiments, the polarizing plate may further include an optical film on the protective film. The optical film may include at least one of, for example, a protective film for protecting the surface of the polarizing plate, a reflective film, an anti-reflective film, a diffusive film, a retardation film, and/or a brightness-enhancing film.

For example, the polarizing plate may include the protective film on one surface of the polarizer, and may further include the optical film on the other side of the polarizer (i.e., on the surface on which the protective film is not formed).

Alternatively, the polarizing plate may include protective films on both surfaces of the polarizer, and may further include the optical film on the protective film. In this case, the optical film may be formed on the protective film on one side of the polarizer, or may be formed on each of the protective films on both sides of the polarizer.

The optical film satisfies a shrinkage stress ratio as calculated by the following Equation 2 in relation to the TD shrinkage stress of the polarizer. For example, the polarizing plate according to embodiments of the invention may have a TD shrinkage stress ratio $SR_B$ of about 1% to about 10%, as calculated by Equation 2.

$$SR_B (\%) = (S3/S2) \times 100 \quad (2)$$

In Equation 2, S3 is the sum of the TD shrinkage stresses of the respective optical films, and S2 is the TD shrinkage stress of the polarizer.

As the protective film for the surface of the polarizing plate, any film may be used without limitation so long as the film is a suitable optically transparent film. For example, the protective film for the surface of the polarizing plate may include a polyester film, such as polyethylene terephthalate, polybutylene terephthalate, polyethylene naphthalate, polybutylene naphthalate, or the like.

The polarizing plate according to embodiments of the invention may be formed by interposing an adhesive layer between the optical film and the protective film for the polarizer. The adhesive layer may be formed of any suitable adhesive. For example, the adhesive may include pressure sensitive adhesives (PSA), UV-curable adhesives, or the like. The adhesive layer may have any thickness without limitation. For example, the adhesive layer may have a thickness of about 0.5 µm to about 20 µm, or about 1 µm to about 10 µm. Within either of these ranges, the adhesive layer can be used to manufacture a polarizing plate having reduced thickness.

Figure 2:
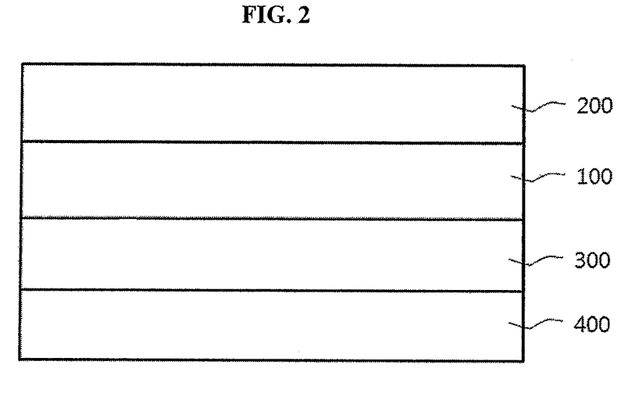
FIG. 2 is a schematic cross-sectional view of a polarizing plate that includes a protective film on an upper surface of a polarizer and an adhesive layer and a release film on a lower surface of the polarizer.

FIG. 2 is a schematic cross-sectional view of a polarizing plate according to embodiments of the present invention. Referring to FIG. 2, the polarizing plate includes a polarizer 100, a protective film 200 formed on an upper surface of the polarizer 100, an adhesive layer 300 formed on a lower surface of the polarizer 100, and a release film 400 formed on a lower surface of the adhesive layer 300. The protective film may have a shrinkage stress ratio of about 1% to about 10%, as calculated by Equation 1 above. For example, the shrinkage stress ratio may be about 2% to about 9%, or about 2% to about 7%.

The polarizing plate depicted in FIG. 2 is substantially the same as the polarizing plate depicted in FIG. 1 except that the adhesive layer and the release film are further provided under the polarizer.

The adhesive layer 300 attaches the polarizing plate to an LCD panel, and may be formed of any suitable adhesive. For example, the adhesive may include pressure sensitive adhesives or UV-curable adhesives. The adhesive layer may have any thickness without limitation. For example, the adhesive layer may have a thickness of about 0.5 µm to about 20 µm, or about 1 µm to about 10 µm. Within either of these ranges, the adhesive layer may be used to manufacture a polarizing plate having reduced thickness.

The release film 400 may be attached to a surface of the adhesive layer to protect the adhesive layer. When the polarizing plate is attached to an LCD panel, the release film 400 is removed such that the adhesive layer can adjoin the LCD panel. There is no limit to the material for the release film. The release film may be any suitable release film. For example, the release film may be formed of a material selected from cellulose resins including triacetylcellulose and the like, polyester resins including polyethylene terephthalate, polybutylene terephthalate, polyethylene naphthalate, polybutylene naphthalate, and the like, cycloolefin resins, polycarbonate resins, polyethersulfone resins, polysulfone resins, polyamide resins, polyimide resins, non-cyclic polyolefin resins, polyarylate resins, polyvinyl alcohol resins, polyvinyl chloride resins, polyvinylidene chloride resins, and the like.

According to the embodiments of the invention, the polarizing plate may have a curl height of, for example, about +4.0 mm to about −4.0 mm, as measured at 23° C. and 55% RH. In this case, it is easy to treat the polarizing plate and it is possible to minimize bubble generation upon attachment of the polarizing plate to an LCD panel. In some embodiments, for example, the polarizing plate may have a curl height of, for example, about +3.0 mm to about −3.0 mm, as measured at 23° C. and 55% RH. Within this range, it is easy to treat the polarizing plate and it is possible to further improve reliability of the LCD panel.

Figure 3:
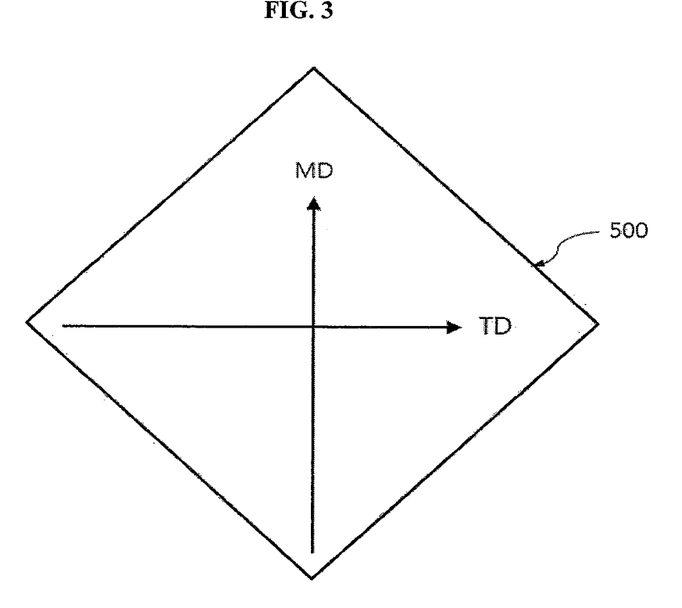
FIG. 3 is a diagram showing a cutting direction of a sample for measuring a 45° curl height of a polarizing plate.
Figure 4:
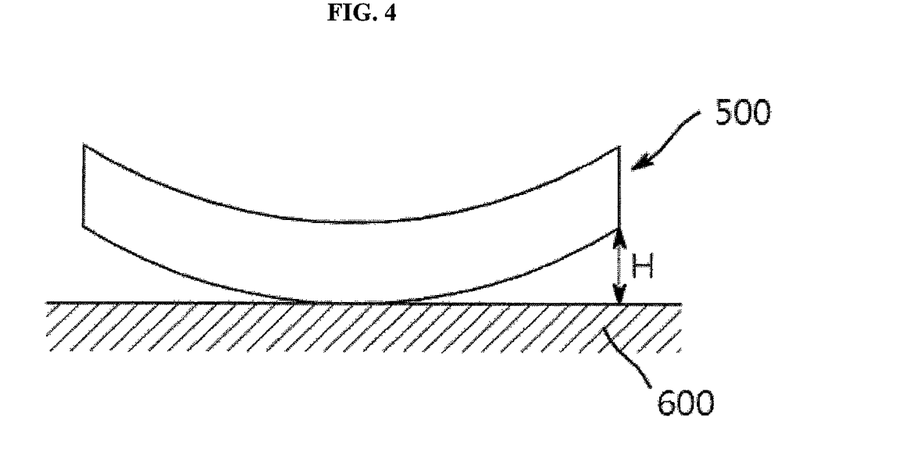
FIG. 4 is a diagram showing a method of measuring a curl height of a polarizing plate.

Curling of the polarizing plate and a method of measuring the same will now be described with reference to FIGS. 3 and 4. FIG. 3 shows a polarizing plate sample 500 cut at 45 degrees with respect to each of the machine direction (MD) and the transverse direction (TD). The polarizing plate sample 500 has a size of 20 cm×20 cm. FIG. 4 shows a method of measuring the curl height of the polarizing plate. Curling of the polarizing plate can be evaluated by measuring the maximum curl height H of the polarizing plate sample 500 curled upwards with respect to a horizontal reference 600. A curl height H having a positive value (+) means that the polarizing plate including a polarizer and a protective film for the polarizer, is curled in a direction in which the protective film for the polarizer is formed. A curl height H having a negative value (−) means that the polarizing plate including the polarizer and the protective film for the polarizer, is curled in a direction in which the polarizer is formed.

According to some embodiments of the present invention, a method of manufacturing the polarizing plate described above is provided. In some embodiments, the method of manufacturing the polarizing plate includes stacking a protective film on a polarizer. The protective film has a TD shrinkage stress ratio of about 1% to about 10%. The TD shrinkage stress ratio of the protective film is calculated by Equation 1, as described above.

The polarizer may be manufactured by any suitable method. For example, the polarizer may be manufactured by swelling, dyeing, complementary-coloring, stretching, and cross-linking a polyvinyl alcohol film.

For example, the polyvinyl alcohol film may first be swelled in a swelling bath filled with deionized water at 25° C. to 35° C. In the swelling bath, the polyvinyl alcohol film may have an accumulated stretching ratio of about one to two times an initial length thereof. The swollen polyvinyl alcohol film may be dyed in a dyeing bath filled with a dyeing solution. In the dyeing bath, the polyvinyl alcohol film may have an accumulated swelling ratio of about one to about two times an initial value. The dyeing solution may contain an iodine solution or an iodine-potassium iodide solution.

Then, the dyed polyvinyl alcohol film may be stretched in an elongation bath filled with a solution containing boric acid, potassium iodide or a mixture thereof such that the accumulated stretching ratio of the polyvinyl alcohol film can be about three times to about six times an initial value. Then, the stretched film is subjected to complementary-coloring in a complementary-coloring bath, which is filled with the solution containing boric acid, potassium iodide or a mixture thereof and has a temperature of 30° C. to 45° C., and then stretched. Dyeing, complementary-coloring and stretching may be performed at the same time, and stretching may include dry elongation, wet elongation, or a combination thereof. Elongation of the polarizer may be adjusted such that a total stretching ratio (of the three to six times accumulated-stretching ratio in the last stage) can range from about 5 to about 10.

In stacking the protective film on the polarizer, the protective film may be attached to the polarizer by any suitable adhesive for the polarizing plate. For example, a pressure sensitive adhesive, a photo-curable adhesive, a water-based adhesive, or the like may be used.

The method of manufacturing the polarizing plate may further include adding an optical film to one or both surfaces of a stack body of the polarizer and the protective film.

The optical film may include, for example, a protective film for the surface of the polarizing plate, a reflective film, an anti-reflective film, a diffusive film, a retardation film, and/or a brightness-enhancing film. Such additional optical film satisfies a shrinkage stress ratio calculated by Equation 2 in relation to the TD shrinkage stress of the polarizer.

Next, embodiments of the present invention will be described with reference to certain examples. However, it is understood that these examples are provided for illustration only and are not to be construed in any way as limiting the invention.

Preparation of Polarizer

Polarizer 1

A 30 μm thick polyvinyl alcohol (PVA) film (polymerization degree: 2,400, width: 650 mm, saponification degree: 99.9 mol % or more, VF-PE #3000, Kuraray Co., Ltd., Japan) was stretched (in a tensioned state so as not to be loosened) in a swelling bath, which was filled with deionized water at 30° C., until the film had an accumulated stretching ratio of 1.40 times an initial length thereof. Then, the PVA film was stretched in a dyeing bath, which was filled with a dyeing solution containing iodine/potassium iodide in a weight ratio of 1/23 and having a temperature of 30° C., until the film had an accumulated stretching ratio of 1.70 times. Thereafter, the film was stretched to a stretching ratio of 2.5 times in a stretching bath, which was filled with a stretching solution containing 3.0% boric acid and 2.6% potassium iodide and having a temperature of 53° C. Then, the film was subjected to uniaxial stretching in a complementary-coloring bath, which was filled with a complementary-coloring solution containing 1.0% boric acid and 4.0% potassium iodide and having a temperature of 40° C., until the film had a total stretching ratio of 6.0 times the initial length. Thereafter, the film was dried at 50° C. for 3 minutes, thereby preparing a 12 μm thick iodine-based polarizer 1. All stretching was performed in the machine direction (MD).

Polarizer 2

A 60 μm thick polyvinyl alcohol (PVA) film (polymerization degree: 2,400, width: 650 mm, saponification degree: 99.9 mol % or more, VF-PS #6000, Kuraray Co., Ltd., Japan) was stretched (in a tensioned state so as not to be loosened) in a swelling bath, which was filled with deionized water at 30° C., until the film had an accumulated stretching ratio of 1.40 times an initial length thereof. Then, the PVA film was stretched in a dyeing bath, which was filled with a dyeing solution containing iodine/potassium iodide in a weight ratio of 1/23 and having a temperature of 30° C., until the film had an accumulated stretching ratio of 1.70 times. Thereafter, the film was stretched to a stretching ratio of 2.5 times in a stretching bath, which was filled with a stretching solution containing 3.0% boric acid and 3.0% potassium iodide and having a temperature of 57° C. Then, the film was subjected to uniaxial stretching in a complementary-coloring bath, which was filled with a complementary-coloring solution containing 1.0% boric acid and 4.0% potassium iodide and having a temperature of 40° C., until the film had a total stretching ratio of 6.0 times. Thereafter, the film was dried at 50° C. for 3 minutes, thereby preparing a 22 μm thick iodine-based polarizer 2. All stretching was performed in the machine direction (MD).

Polarizer 3

A 30 μm thick polyvinyl alcohol (PVA) film (polymerization degree: 2,400, width: 650 mm, saponification degree: 99.9 mol % or more, VF-PS #6000, Kuraray Co., Ltd., Japan) was stretched (in a tensioned state so as not to be loosened) in a swelling bath, which was filled with deionized water at 30° C., until the film had an accumulated stretching ratio of 1.40 times an initial length thereof. Then, the PVA film was stretched in a dyeing bath, which was filled with a dyeing solution containing iodine/potassium iodide in a weight ratio of 1/23 and having a temperature of 30° C., until the film had an accumulated stretching ratio of 1.70 times the initial length. Thereafter, the film was stretched to an elongation of 2.5 times in a stretching bath, which was filled with a stretching solution containing 2.6% boric acid and 3.0% potassium iodide and having a temperature of 53° C. Then, the film was subjected to uniaxial stretching in a complementary-coloring bath, which was filled with a complementary-coloring solution containing 1.0% boric acid and 4.0% potassium iodide and having a temperature of 40° C., until the film had a total stretching ratio of 6.0 times the initial length. Thereafter, the film was dried at 50° C. for 3 minutes, thereby preparing a 12 μm thick iodine-based polarizer 3. All stretching was performed in the machine direction (MD).

Protective Films

Protective Film 1

An 80 μm thick polyethylene terephthalate film (TA044, Toyobo Co., Ltd.) was used as the protective film.

Protective Film 2

A 100 μm thick polyethylene terephthalate film (TA015, Toyobo Co., Ltd.) was used as the protective film.

Protective Film 3

An 80 μm thick polyethylene terephthalate film (TA044, Toyobo Co., Ltd.) subjected to annealing at 130° C. for 3 minutes was used as the protective film.

Protective Film 4

An 80 μm thick polyethylene terephthalate film (TA044, Toyobo Co., Ltd.) subjected to annealing at 150° C. for 3 minutes was used as the protective film.

Protective Film 5

A 100 μm thick polyethylene terephthalate film (TA015, Toyobo Co., Ltd.) subjected to annealing at 150° C. for 3 minutes was used as the protective film.

Protective Film 6

A 75 μm thick polyethylene terephthalate film (A4100, Toyobo Co., Ltd.) subjected to typical biaxial stretching was used as the protective film.

EXAMPLES AND COMPARATIVE EXAMPLES

Polarizing plates according to Examples 1-3 and Comparative Examples 1-3 were manufactured by the following methods.

Example 1

A UV-curable adhesive (UCX-522, Toagosei Co., Ltd.) was applied to one surface of Polarizer 1, and Protective Film 1 was bonded thereto and subjected to UVA irradiation at an accumulated dose of 1000 mJ/cm$^2$, thereby manufacturing a polarizing plate including a 2 μm thick adhesive layer.

Example 2

A UV-curable adhesive (UCX-522, Toagosei Co., Ltd.) was applied to one surface of Polarizer 2, and Protective Film 2 was bonded thereto and subjected to UVA irradiation at an accumulated dose of 1000 mJ/cm$^2$, thereby manufacturing a polarizing plate including a 2 μm thick adhesive layer.

Example 3

A UV-curable adhesive (UCX-522, Toagosei Co., Ltd.) was applied to one surface of Polarizer 3, and Protective Film 3 was bonded thereto and subjected to UVA irradiation at an accumulated dose of 1000 mJ/cm$^2$, thereby manufacturing a polarizing plate including a 2 μm thick adhesive layer.

Comparative Example 1

A UV-curable adhesive (UCX-522, Toagosei Co., Ltd.) was applied to one surface of Polarizer 1, and Protective Film 4 was bonded thereto and subjected to UVA irradiation at an accumulated dose of 1000 mJ/cm$^2$, thereby manufacturing a polarizing plate including a 2 μm thick adhesive layer.

Comparative Example 2

A UV-curable adhesive (UCX-522, Toagosei Co., Ltd.) was applied to one surface of Polarizer 2, and Protective Film 5 was bonded thereto and subjected to UVA irradiation at an accumulated dose of 1000 mJ/cm$^2$, thereby manufacturing a polarizing plate including a 2 μm thick adhesive layer.

Comparative Example 3

A UV-curable adhesive (UCX-522, Toagosei Co., Ltd.) was applied to one surface of Polarizer 3, and Protective Film 6 was bonded thereto and subjected to UVA irradiation at an accumulated dose of 1000 mJ/cm$^2$, thereby manufacturing a polarizing plate including a 2 μm thick adhesive layer.

Property Evaluation

TD Shrinkage Stress and Shrinkage Stress Ratio

For each of the polarizers and protective films used in the Examples and Comparative Examples, shrinkage stress was measured by the following method.

Measurement of shrinkage stress: The TD shrinkage stress of a rectangular sample having a machine direction (MD) length of 80 mm and a TD width of 10 mm was measured using a shrinkage stress measurement instrument (i.e., TA.XT Plus, Stable Micro Systems Ltd.). To measure the TD shrinkage stress, the sample was fastened at both sides thereof in the transverse direction to the shrinkage stress measurement instrument and left at 80° C. for 100 minutes.

The measured TD shrinkage stress was applied to the following Equation 1 to calculate the shrinkage stress ratio $SR_A$. The results are shown in Table 1.

$$SR_A (\%) = (S1/S2) \times 100 \quad (1)$$

In Equation 1, S1 is the TD shrinkage stress of the protective film for the polarizer, and S2 is the TD shrinkage stress of the polarizer.

Measurement of Curl Height

For each of the polarizing plates manufactured in the Examples and Comparative Examples, a polarizing plate sample having a size of 20 cm×20 cm was manufactured by cutting the polarizing plate at 45 degrees with respect to each of the machine direction (MD) and the transverse direction (TD).

For each of the polarizing plate samples, the maximum curl height H of the polarizing plate sample 500 curled upwards with respect to a horizontal reference 600 at 23° C. and 55% RH as shown in FIG. 4 was measured. The results are shown in Table 1.

In Table 1, a curl height H having a positive value (+) means that the polarizing plate (including a polarizer and a protective film for the polarizer) was curled in the direction in which the protective film for the polarizer was formed. A curl height H having a negative value (−) means that the polarizing plate (including the polarizer and the protective film for the polarizer) was curled in the direction in which the polarizer was formed.

Observation of Bubbling and Detachment

An adhesive layer was formed on a lower surface of each of the polarizing plates of the Examples and Comparative Examples. The adhesive layer was formed by applying an acrylic adhesive (SK-Dyne, Soken) to the lower surface of the polarizing plate, followed by heat curing at 85° C. for 5 minutes. The adhesive layer had a thickness of 20 μm.

The polarizing plate was bonded to a liquid crystal display panel via the adhesive layer of the polarizing plate, and bubble generation or detachment was evaluated through observation with the naked eye. No bubble generation or detachment was rated as ○, slight bubble generation or detachment was rated as Δ, and significant bubble generation or detachment was rated as ×. Results are shown in Table 1.

TABLE 1

| | Thickness (μm) | | TD shrinkage stress (N/10 mm) | | Shrinkage stress ratio (%) SRA | Curl height (mm) H | Bubbling or detachment |
|---|---|---|---|---|---|---|---|
| | Polarizer | Protective film | Polarizer | Protective film | | | |
| Example 1 | 12 | 80 | 1.5 | 0.10 | 6.7 | +0.5 | ○ |
| Example 2 | 22 | 100 | 3.5 | 0.20 | 5.7 | +1.0 | ○ |
| Example 3 | 12 | 80 | 1.8 | 0.05 | 2.8 | −2.5 | ○ |
| Comparative Example 1 | 12 | 80 | 1.5 | 0.01 | 0.7 | −5.5 | × |
| Comparative Example 2 | 22 | 100 | 3.8 | 0.02 | 0.5 | −7.5 | × |
| Comparative Example 3 | 12 | 75 | 2.0 | 0.4 | 20.0 | +7.0 | Δ |

As can be seen in Table 1, the polarizing plates of Examples 1 to 3, which had shrinkage stress ratios of the polarizer to the protective film from 1 to 10, suppressed curling and did not suffer from bubble generation or detachment when bonded to the liquid crystal display panel. On the contrary, the polarizing plates of Comparative Examples 1 to 3, in which the polarizer had the same thickness as that of the protective film, suffered from severe curling and significant bubble generation or detachment.

While certain exemplary embodiments of the present invention have been illustrate and described, it is understood that various modifications, changes, and alterations can be made to the described embodiments by those of ordinary skill in the art without departing from the spirit and scope of the invention, as embodied in the attached claims.

What is claimed is:

1. A polarizing plate comprising:
   a polarizer having a first shrinkage stress in a transverse direction (TD); and
   a protective film on at least one surface of the polarizer, the protective film having a second shrinkage stress in the TD, the second shrinkage stress being different from the first shrinkage stress,
   wherein a TD shrinkage stress ratio $SR_A$ of the polarizing plate is about 1% to 10% as calculated by Equation 1:

$$SR_A (\%) = (S1/S2) \times 100 \quad (1)$$

wherein S1 is the second shrinkage stress of the protective film, and S2 is the first shrinkage stress of the polarizer.

2. The polarizing plate according to claim 1, wherein the polarizing plate comprises the protective film on only an upper surface of the polarizer.

3. The polarizing plate according to claim 1, wherein the first shrinkage stress S2 of the polarizer is about 0.5 N/10 mm to about 10.0 N/10 mm, and the second shrinkage stress S1 of the protective film is about 0.005 N/10 mm to about 1.0 N/10 mm.

4. The polarizing plate according to claim 1, wherein the protective film comprises a polyester resin film, a cellulose resin film, a cyclic polyolefin resin film, a polycarbonate resin film, a polyethersulfone resin film, a polysulfone resin film, a polyamide resin film, a polyimide resin film, a non-cyclic polyolefin resin film, a polyarylate resin film, a polyvinyl alcohol resin film, a polyvinyl chloride resin film, or a polyvinylidene chloride resin film.

5. The polarizing plate according to claim 2, further comprising:
   a release film formed on a lower surface of the polarizer; and
   an adhesive layer formed between the release film and the polarizer.

6. The polarizing plate according to claim 1, further comprising:
   an optical film comprising at least one of a surface protective film for the polarizing plate, a reflective film, an anti-reflective film, a diffusive film, a retardation film, or a brightness-enhancing film.

7. The polarizing plate according to claim 6, wherein the polarizing plate has a TD shrinkage stress ratio $SR_B$ of about 1% to about 10% as calculated by Equation 2:

$$SR_B (\%) = (S3/S2) \times 100 \quad (2)$$

wherein S3 is a sum of TD shrinkage stresses of the optical films, and S2 is the first shrinkage stress of the polarizer.

8. The polarizing plate according to claim 1, wherein the polarizing plate has a curl height of about +4.0 mm to about −4.0 mm, as measured at 23° C. and 55% RH.

9. A method of manufacturing the polarizing plate of claim 1, comprising:

forming a stack body by stacking the protective film on one surface of the polarizer, wherein the stack body has a transverse direction (TD) shrinkage stress ratio $SR_A$ of about 1% to 10%, as calculated by Equation 1:

$$SR_A (\%) = (S1/S2) \times 100 \qquad (1)$$

wherein S1 is the second shrinkage stress of the protective film, and S2 is the first shrinkage stress of the polarizer.

10. The method according to claim 9, wherein the polarizer is manufactured by dyeing and stretching a polyvinyl alcohol film.

11. The method according to claim 10, wherein the polarizer is stretched to have an accumulated stretching ratio of about 5 to about 10.

12. The method according to claim 9, further comprising:

attaching an optical film to one or both surfaces of the stack body.

13. The method according to claim 12, wherein the polarizing plate has a TD shrinkage stress ratio $SR_B$ of about 1% to about 10%, as calculated by Equation 2:

$$SR_B (\%) = (S3/S2) \times 100 \qquad (2)$$

wherein S3 is the sum of TD shrinkage stresses of the optical films, and S2 is the first shrinkage stress of the polarizer.

* * * * *